United States Patent [19]

Kveton

[11] 3,957,742
[45] May 18, 1976

[54] ELASTOMERIC COMPOSITIONS CONTAINING HEXAHYDRO-S-TRIAZINES

[75] Inventor: James A. Kveton, Orland Park, Ill.

[73] Assignee: Nalco Chemical Company, Oak Brook, Ill.

[22] Filed: May 9, 1975

[21] Appl. No.: 575,882

[52] U.S. Cl. .............................. 526/261; 260/42.47; 526/334; 526/338; 526/350
[51] Int. Cl.² ........................................ C08K 5/34
[58] Field of Search ............. 260/800, 83.7, 85.3 R, 260/94.7 R, 94.7 N, 80.78, 85.1

[56] References Cited
UNITED STATES PATENTS

| | | | |
|---|---|---|---|
| 2,615,882 | 10/1952 | Zerner | 260/88.3 |
| 3,097,111 | 7/1963 | Danielson | 117/162 |

Primary Examiner—Paul R. Michl
Attorney, Agent, or Firm—John G. Premo; Barry W. Sufrin; Robert A. Miller

[57] ABSTRACT

Certain elastomers may be adhered to a large number of solid surfaces by incorporating into such elastomers hexahydro-s-triazines having the formula:

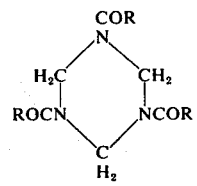

R is either the radical $CH_2=CH-$ or $CH_2=C(CH_3)$.

4 Claims, No Drawings

ELASTOMERIC COMPOSITIONS CONTAINING HEXAHYDRO-S-TRIAZINES

Many elastomers such as natural and synthetic rubbers normally are not adherent to solid surfaces such as metals, plastics, wood, glass and the like. In order to make these elastomers adhere to such surfaces, it is customary to use adhesives which must be coated on the solid surface and/or the elastomer.

If it were possible to produce an elastomer inherently capable of adhering to a variety of solid surfaces, a valuable industrial material would thereby be afforded. From such an elastomer, for example, it would be a simple matter to prepare self-sealing gaskets, cushioning devices and the like, which could be applied to solid surfaces without necessitating the use of a separate application of adhesive material.

OBJECTS OF THE INVENTION

It is an object of the invention to provide an elastomeric material which is capable of adhering to a wide variety of solid surfaces.

Other objects will appear hereinafter.

THE INVENTION

In accordance with the invention, it has been found that normally non-adherent elastomer rubbers may be made adherent to a large number of solid surfaces by uniformly distributing throughout such elastomers during their manufacture from 0.1 to about 25 parts and preferably 0.5 to 10 parts per hundred, by weight of hexahydro-s-triazins of the formula

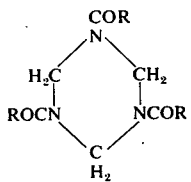

In the above formula, R is a hydrocarbon radical of not more than 10 carbon atoms which contains at least 1 olefinic group. In a preferred embodiment of the invention, R is either the radical $CH_2=CH-$ or $CH_2=C(CH_3)$.

Triazines of the types described above are readily prepared in accordance with the teachings set forth in the JOURNAL OF THE AMERICAN CHEMICAL SOCIETY at page 3079 of the September 1948 issue. The teachings of this article are incorporated herein by reference.

The general synthesis described in the above article resides in the reaction of certain nitriles, such as acrylonitrile, with formaldehyde. Triazines useful in the practice of this invention may be produced in this manner.

THE ELASTOMERS

A wide variety of normally non-adherent elastomer rubbers may be treated with the triazines described to render them adhesive to solid surfaces. Both synthetic and natural rubbers may be treated.

Illustrative of the synthetic elastomers are the following:

Polybutadiene (BR)
Polyisoprene (IR)
Cold SBR
Butyl (IIR)
Ethylene Propylene Diene Monomer Rubber (EPDM)

These elastomers may be characterized as being synthetic non-polar hydrocarbon rubbers. For further details with respect to the chemical composition of these rubbers, see the ENCYCLOPEDIA OF CHEMICAL TECHNOLOGY, 2nd Edition, Volume 17 — "Rubber Compounding".

The elastomers thus treated are rendered adherent to such solid surfaces as metals, e.g. ferrous metals (iron and steel); non-ferrous metals, e.g. aluminum, copper, magnesium and alloys of these metals, as well as such other solid surfaces as plastics, glass, wood and the like.

EXAMPLES

To illustrate the invention, the following is given by way of example.

To a non-adhesive EPDM rubber and a non-adhesive SBR rubber which were formulated with other known rubber additives, 1 and 5 parts per hundred quantities of the compound, triacrylol hexahydro-s-triazine were added. See Table I below. The addition was made during the processing of the rubber prior to the curing. The curing was done in metal molds. Upon curing the rubber was tightly adhered to the mold. The identical formulas without the additive were released readily from the mold under similar curing conditions.

TABLE I

| TRIACRYLOL HEXAHYDRO-S-TRIAZINE | AMOUNT 1 PPH | AMOUNT 5PPH |
|---|---|---|
| EPDM rubber | 100 | — |
| SBR rubber | — | 100 |
| Carbon Black | 75 | 75 |
| Zinc Oxide | 3.0 | 3.0 |
| Sulfur | 2.5 | 2.5 |
| Mercaptobenzothiazole Cyclohexyl Sulfenamide | 1.0 | 1.0 |

HISTORICAL BACKGROUND

The invention disclosed herein was the subject of two prior patent applications. The first of these applications was Ser. No. 20,013 filed Mar. 16, 1970 and abandoned for failure to prosecute. The second prior application, a continuation-in-part, was Ser. No. 167,514 filed July 29, 1971 and expressly abandoned Sept. 7, 1972. In each case, the patent application was abandoned, but not the invention disclosed therein.

Prior art cited in the Ser. No. 20,013 application included D'Alelio (U.S. Pat. No. 3,053,796), Zerner (U.S. Pat. No. 2,615,882) and Handbook of Adhesives, Irving Skeist, Van Nostrand Reinhold Co., New York 1962, page 229. Prior art cited in the Ser. No. 167,514 application included Danielson (U.S. Pat. No. 3,097,111), Endter (U.S. Pat. No. 3,517,722), and Adhesion and Adhesives, Parker, R.S.R. and Taylor, P., Pergamon Press, London 1966, pages 70–72.

I claim:

1. A normally non-adhesive elastomeric composition which is characterized as having adhesive properties when applied to a solid surface comprising rubber having uniformly dispersed there throughout from about 0.1 to about 25 parts per hundred of a hexahydro-s-triazine having the formula

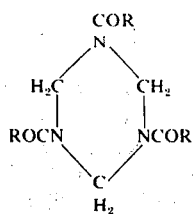

where R is an aliphatic hydrocarbon radical of not more than 10 carbon atoms containing at least 1 olefinic group.

2. The elastomeric composition of claim 1 where R is from the group consisting of $CH_2=CH-$ and $CH_2=C(CH_3)$.

3. The elastomeric composition of claim 2 where the elastomer is a synthetic rubber.

4. The elastomeric composition of claim 3 where R is $CH_2=CH-$ and the synthetic rubber is from the group consisting of an SBR rubber and an EDPM rubber.

* * * * *